(12) United States Patent
Malanga

(10) Patent No.: US 11,384,799 B2
(45) Date of Patent: Jul. 12, 2022

(54) UNIVERSAL JOINT ASSEMBLY

(71) Applicant: Dana Automotive Systems Group, LLC, Maumee, OH (US)

(72) Inventor: Matthew T. Malanga, Bowling Green, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 342 days.

(21) Appl. No.: 16/674,343

(22) Filed: Nov. 5, 2019

(65) Prior Publication Data

US 2021/0131503 A1 May 6, 2021

(51) Int. Cl.
*F16D 3/33* (2006.01)

(52) U.S. Cl.
CPC ..................... *F16D 3/33* (2013.01)

(58) Field of Classification Search
CPC ................................. F16D 3/33; F16D 3/385
USPC .................................................. 464/130–132
See application file for complete search history.

(56) References Cited

U.S. PATENT DOCUMENTS

| | | | |
|---|---|---|---|
| 1,693,593 A * | 12/1928 | Cutting | F16D 3/40 464/131 |
| 1,837,043 A * | 12/1931 | Heiden | F16D 3/43 464/131 |
| 3,200,615 A * | 8/1965 | Stokely | F16D 3/41 464/130 |
| 3,545,232 A | 12/1970 | Gerhard | |
| 4,436,516 A | 3/1984 | Olschewski | |
| 4,810,232 A * | 3/1989 | Farrell | F16D 3/2055 464/132 |
| 4,943,262 A | 7/1990 | Schultze | |
| 5,326,322 A | 7/1994 | Fechter | |
| 6,520,859 B2 * | 2/2003 | Beitzel | F16D 3/385 464/132 |
| 6,976,922 B2 | 12/2005 | Smith | |
| 9,404,530 B2 | 8/2016 | Koyama | |
| 10,036,623 B2 | 7/2018 | Yamaishi | |

* cited by examiner

*Primary Examiner* — Greg Binda
(74) *Attorney, Agent, or Firm* — Marshall & Melhorn, LLC

(57) ABSTRACT

A joint assembly for use in a vehicle. The joint assembly includes a first joint member drivingly connected to a second joint member by one or more third joint members. The joint assembly further includes one or more bearing cup assemblies having a bearing cup, one or more bearings and one or more sealing members. The bearing cup has a receiving portion having a size and shape to receive and/or retain at least a portion of one or more trunnions extending from a body portion of the one or more third joint members. At least a portion of the one or more bearings are interposed between the one or more trunnions and one or more side surfaces of the receiving portion. Additionally, the one or more sealing members may be connected to and/or sealingly engaged with at least a portion of the outer surface of the one or more trunnions.

13 Claims, 5 Drawing Sheets

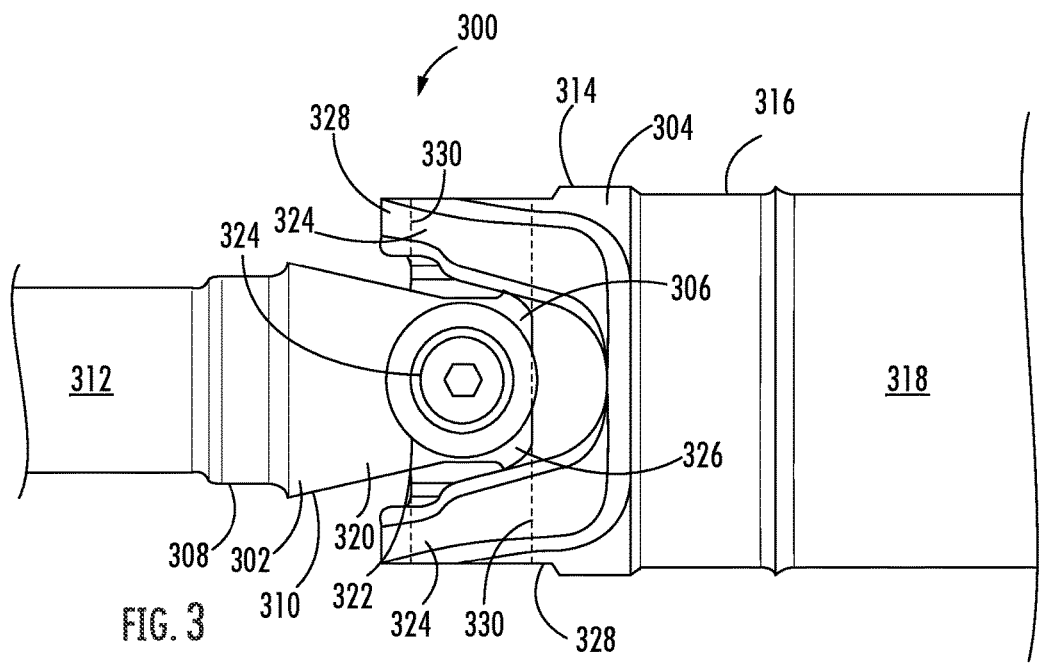
FIG. 3
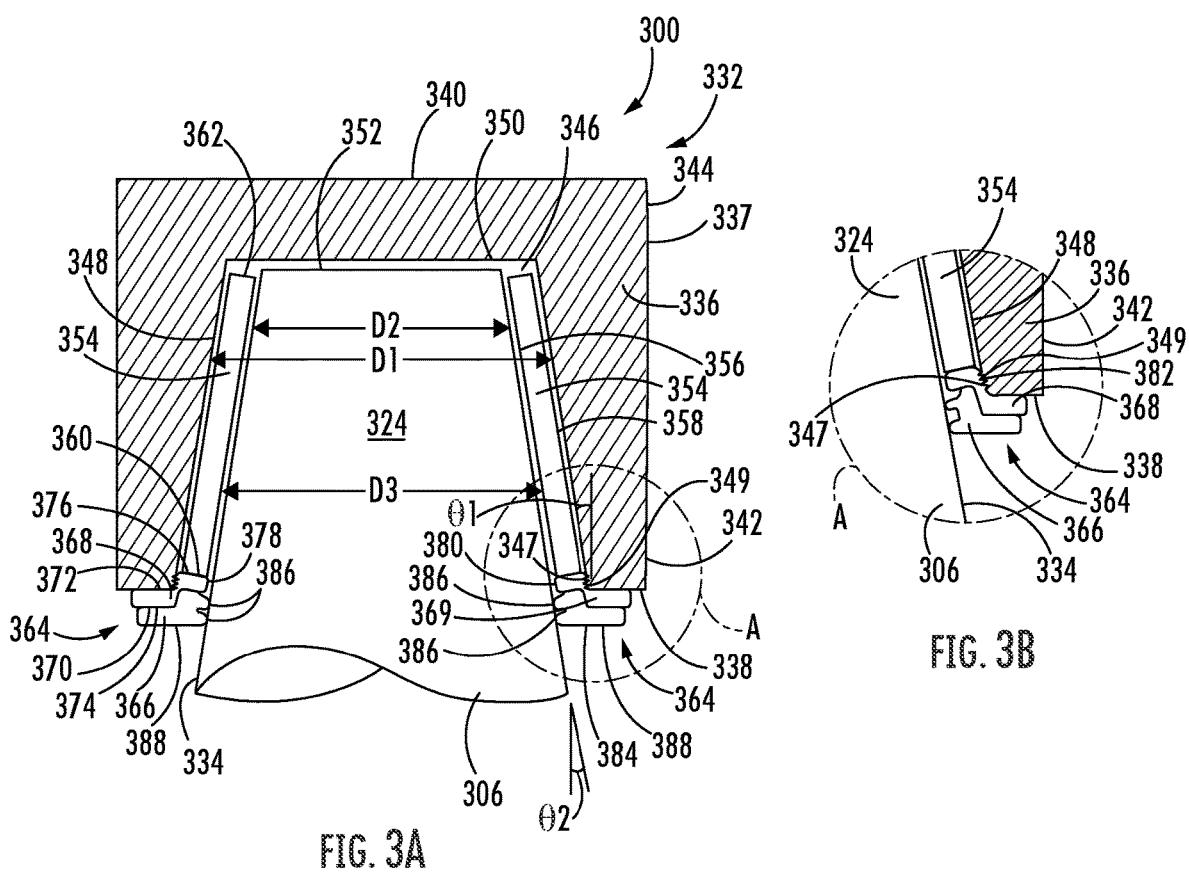
FIG. 3A
FIG. 3B

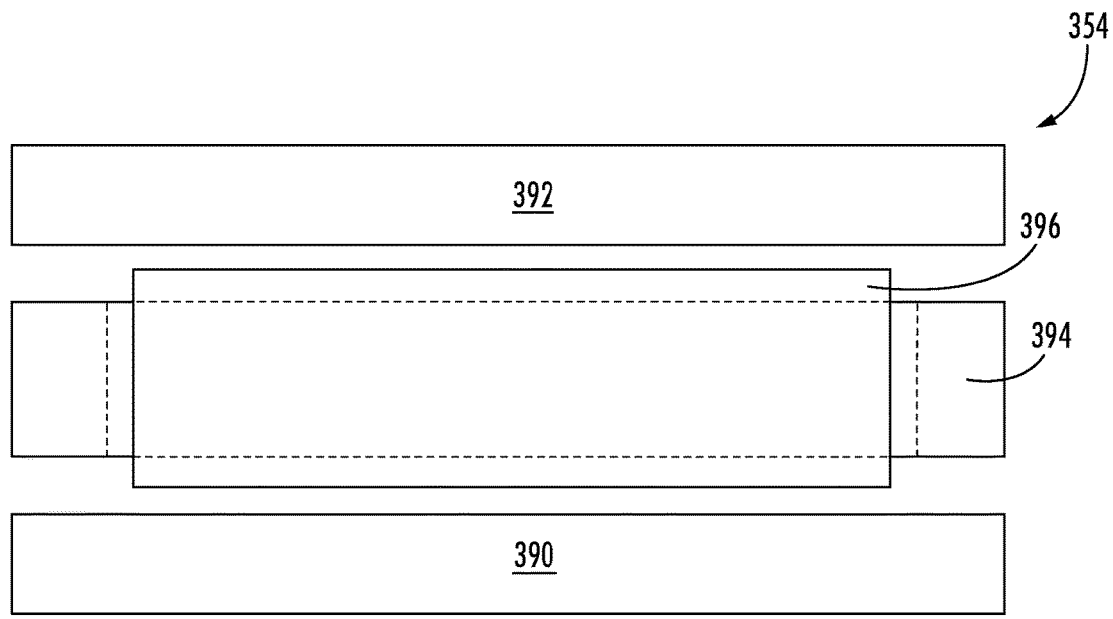
FIG. 3C
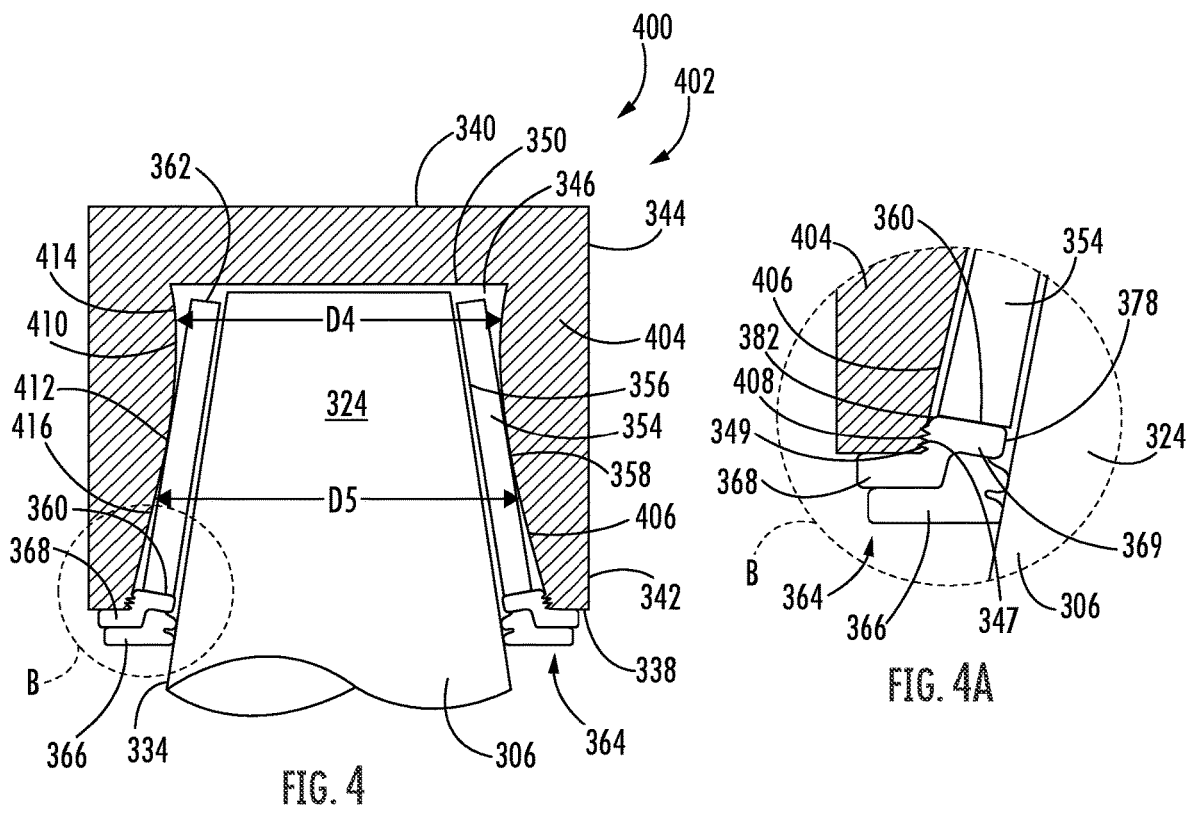
FIG. 4
FIG. 4A

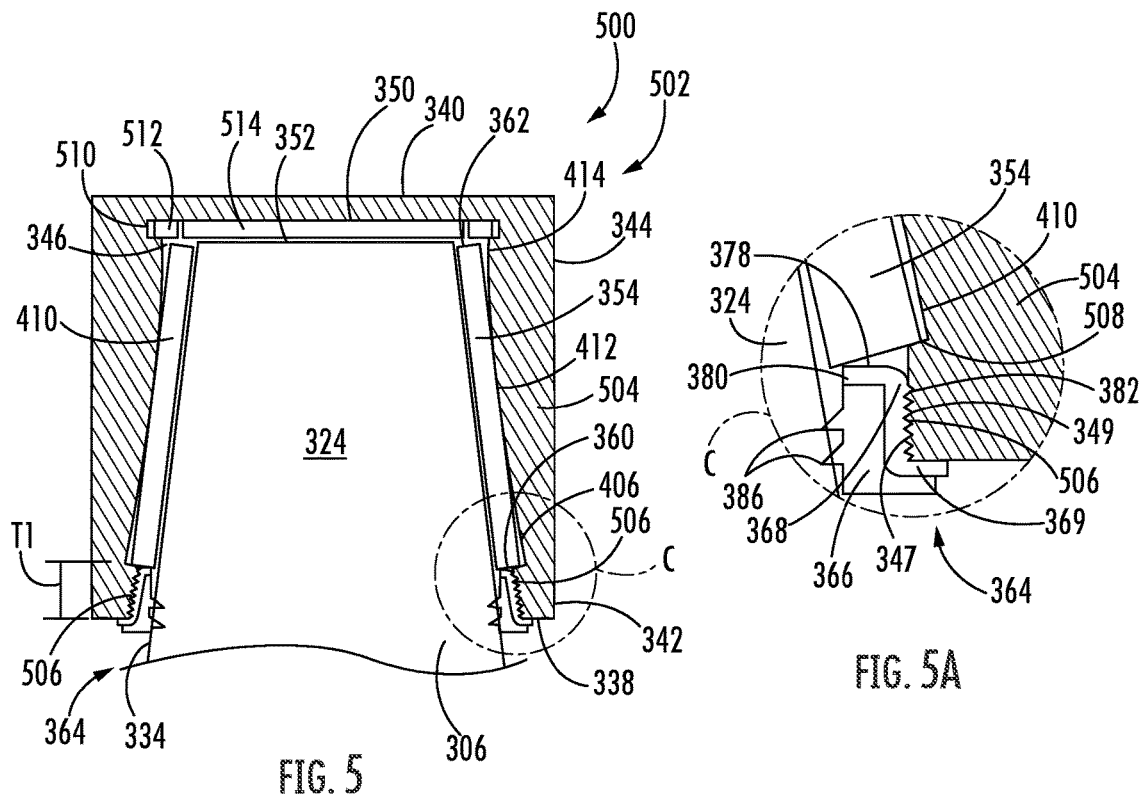
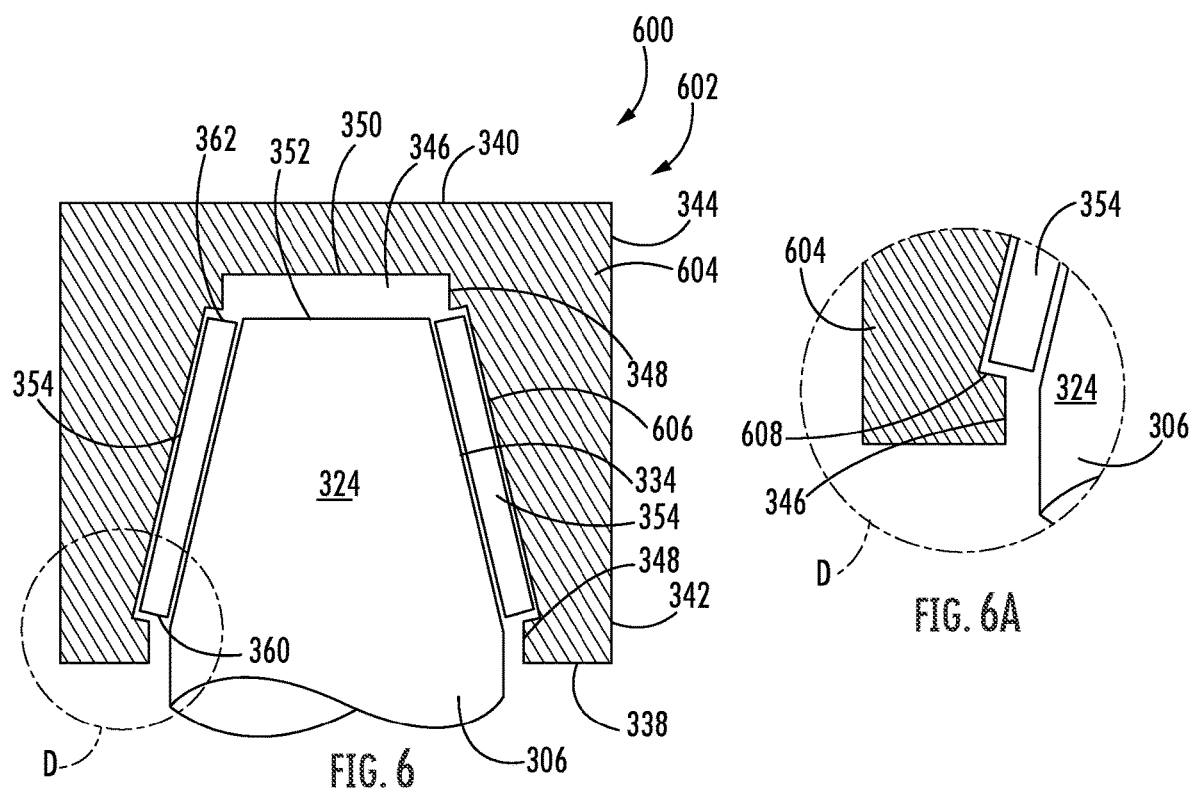

UNIVERSAL JOINT ASSEMBLY

FIELD OF THE DISCLOSURE

The present disclosure relates to a universal joint assembly for use in a vehicle.

BACKGROUND OF THE DISCLOSURE

Various universal joint assemblies are known in the art. Conventional universal joint assemblies are complex and require a large number of components to carry the loads experienced in the tangential plane and the radial plane. The additional components needed to carry these loads adds weight and increases the overall amount of friction within the universal joint assembly which in turn aids in reducing the overall efficiency of the universal joint assembly. Additionally, the additional components needed to carry the loads experienced by the joint assembly in the tangential and radial planes when in operation add an undesirable amount of complexity, cost, and tends to cause failures within the universal joint assembly thereby reducing the overall life and durability of the assembly.

It would therefore be advantageous to develop a universal joint assembly that has a reduced overall coefficient of friction, an improved flex effort, an improved overall balancing, a reduced complexity, a reduced weight and is more cost efficient. Additionally, it would be advantageous to develop a universal joint assembly that is more efficient and has an increased overall life and durability.

SUMMARY OF THE DISCLOSURE

A joint assembly for use in a vehicle. The joint assembly includes a first joint member that is drivingly connected to a second joint member by one or more third joint members. The joint assembly may further include one or more bearing cup assemblies having a bearing cup, one or more bearings and one or more sealing members. The bearing cup has a receiving portion therein having a size and shape to receive and/or retain at least a portion of one or more trunnions extending from a body portion of the one or more third joint members. At least a portion of the one or more bearings are interposed between the outer surface of the one or more trunnions and one or more side surfaces of the receiving portion in the bearing cup. Additionally, at least a portion of the one or more sealing members may be connected to and/or sealingly engaged with at least a portion of the outer surface of the one or more trunnions of the one or more third joint members.

According to the previous aspect of the disclosure, the joint assembly may be a universal joint assembly, a universal coupling assembly, a Spicer joint assembly, a Hooke's joint assembly or a U-joint assembly.

According to any one of the previous aspects of the disclosure, at least a portion of the one or more trunnions of the one or more this joint members may have a substantially frusto-conical shape.

According to any one of the previous aspects of the disclosure, at least a portion of the receiving portion in the bearing cup may have a substantially frusto-conical in shape.

According to any one of the previous aspects of the disclosure, the one or more side surfaces of the receiving portion in the bearing cup may extend at an angle θ1 inward toward the one or more trunnions of the one or more third joint members.

According to any one of the previous aspects of the disclosure, the one or more side surfaces of the receiving portion in the bearing cup may have one or more substantially arcuate portions. At least a portion of the one or more substantially arcuate portions may be in direct contact with at least a portion of the one or more bearings of the one or more bearing cup assemblies.

According to any one of the previous aspects of the disclosure, the one or more substantially arcuate portions of the one or more side surfaces of the receiving portion in the bearing cup may be substantially concave and/or substantially convex in shape.

According to any one of the previous aspects of the disclosure, the one or more substantially arcuate portions of the one or more side surfaces of the receiving portion in the bearing cup may have a first increasing diameter portion, a second decreasing diameter portion, and an innermost portion. At least a portion of the innermost portion of the one or more substantially arcuate portions may be in direct contact with at least a portion of the one or more bearings of the one or more bearing cup assemblies.

According to any one of the previous aspects of the disclosure, the one or more sealing members may have one or more support portions and/or one or more sealing members. At least a portion of an outer surface of the one or more support portions may be connected to at least a portion of the bearing cup and at least a portion of the one or more support portions may be sealingly engaged with at least a portion of the outer surface of the one or more trunnions of the one or more third joint members.

According to any one of the previous aspects of the disclosure, the one or more support portions of the one or more sealing members may be in direct contact with and provide support for at least a portion of the one or more bearings of the one or more bearing cup assemblies.

According to any one of the previous aspects of the disclosure, the one or more support portions of the one or more sealing members may have a plurality of sealing member threads that are selectively meshingly engagable with a plurality of receiving portion threads on the one or more side surfaces of the receiving portion in the bearing cup.

According to any one of the previous aspects of the disclosure, the one or more side surfaces of the receiving portion in the bearing cup may have one or more sealing member attachment surfaces. At least a portion of the plurality of receiving portion threads may be disposed on the one or more sealing member attachment surfaces.

According to any one of the previous aspects of the disclosure, the one or more sealing member attachment surfaces may extend substantially perpendicular to a first end of the bearing cup.

According to any one of the previous aspects of the disclosure, a first end portion of the one or more side surfaces may have one or more protruding portions extending outward from the one or side surfaces toward the one or more trunnions of the one or more third joint members. At least a portion of the one or more bearings may be disposed outboard from and/or are in direct contact with at least a portion of the one or more protruding portions of the one or more side surfaces.

According to any one of the previous aspects of the disclosure, the one or more protruding portions of the one or more side surfaces of the receiving portion in the bearing cup may have a plurality of receiving portion threads. The plurality of receiving portion threads may be complementary to and selectively engagable with a plurality of sealing member threads on a support portion of the one or more sealing members.

According to any one of the previous aspects of the disclosure, the one or more side surfaces of the receiving portion in the bearing cup may have one or more bearing receiving portions therein. The one or more bearing receiving portions in the bearing cup may be of a size and shape to receive and/or retain at least a portion of the one or more bearings therein.

According to any one of the previous aspects of the disclosure, the one or more bearings may have an inner race, an outer race, a cage, and/or one or more rolling elements. At least a portion of the outer race of the one or more bearings may be elastically deformed by the bearing cup and may be received and/or retained within at least a portion of the one or more bearing receiving portions in the bearing cup.

According to any one of the previous aspects of the disclosure, the outer surface of the one or more trunnions of the one or more third joint members may have one or more bearing receiving portions therein. The one or more bearing receiving portions in the one or more trunnions may be of a size and shape to receive and/or retain at least a portion of the one or more bearings therein.

According to any one of the previous aspects of the disclosure, the one or more bearings have an inner race, an outer race, a cage, and/or one or more rolling elements. At least a portion of the inner race of the one or more bearings may be elastically deformed by the one or more trunnions and may be received and/or retained within at least a portion of the one or more bearing receiving portions in the outer surface of the one or more trunnions.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 3 is a schematic side-view of a joint assembly according to an embodiment of the disclosure;

FIG. 3A is a schematic cross-sectional side-view of a portion of the joint assembly illustrated in FIG. 3 of the disclosure;

FIG. 3B is a schematic cross-sectional detail-view of a portion of the joint assembly illustrated in FIGS. 3 and 3A of the disclosure;

FIG. 3C is a schematic cross-sectional side-view of one or more bearings of said joint assembly according to an embodiment of the disclosure;

FIG. 4 is a schematic cross-sectional side-view of a portion of a joint assembly according to an alternative embodiment of the disclosure;

FIG. 4A is a schematic cross-sectional detail-view of a portion of the joint assembly illustrated in FIG. 4 of the disclosure;

FIG. 5 is a schematic cross-sectional side-view of a portion of a joint assembly according to another embodiment of the disclosure;

FIG. 5A is a schematic cross-sectional detail-view of a portion of the joint assembly illustrated in FIG. 5 of the disclosure;

FIG. 6 is a schematic cross-sectional side-view of a portion of a joint assembly according to yet another embodiment of the disclosure;

FIG. 6A is a schematic cross-sectional detail-view of a portion of the joint assembly illustrated in FIG. 6 of the disclosure;

DETAILED DESCRIPTION OF THE DISCLOSURE

It is to be understood that the devices and processes may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the joint assemblies disclosed herein may be used in automotive, off-road vehicle, all-terrain vehicle, construction, structural, marine, aerospace, locomotive, military, machinery, robotic and/or consumer product applications. Additionally, as a non-limiting example, the joint assemblies disclosed herein may also be used in passenger vehicle, electric vehicle, hybrid vehicle, commercial vehicle, autonomous vehicles, semi-autonomous vehicles and/or heavy vehicle applications.

Figure 1:
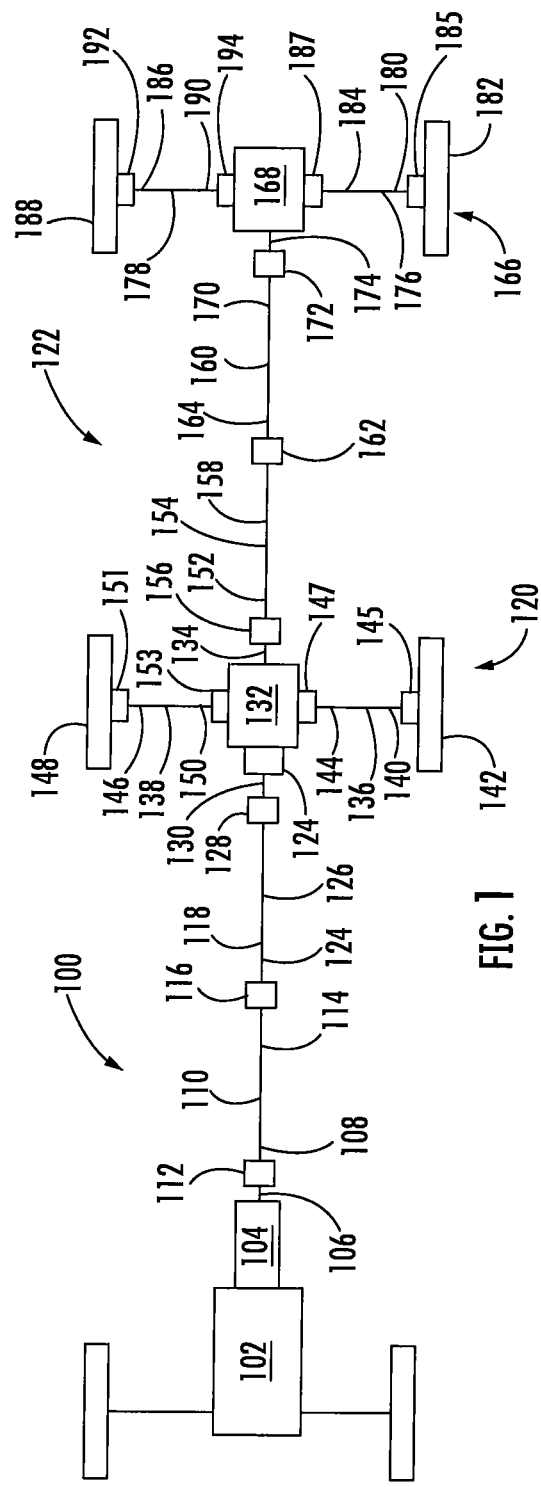
FIG. 1 is a schematic top-plan view of a vehicle having one or more joint assemblies according to an embodiment of the disclosure.

FIG. 1 is a schematic top-plan view of a vehicle 100 having one or more rotating shafts that are balanced according to an embodiment of the disclosure. The vehicle 100 has an engine 102, which is drivingly connected to a transmission 104. A transmission output shaft 106 is drivingly connected to an end of the transmission 104 opposite the engine 102. The transmission 104 is a power management system which provides controlled application of the rotational power generated by the engine by means of a gear box.

A first end portion 108 of a first propeller shaft 110 may be drivingly connected to an end of the transmission output shaft 106 opposite the transmission 104 via a first joint assembly 112. As a non-limiting example, the first joint assembly 112 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the first joint assembly 112 may include a bearing cup assembly according to an embodiment of the disclosure.

As illustrated in FIG. 1 of the disclosure and as a non-limiting example, a second end portion 114 of the first propeller shaft 110 may be drivingly connected to a second joint assembly 116. As a non-limiting example, the second joint assembly 116 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the second joint assembly 116 may include a bearing cup assembly according to an embodiment of the disclosure.

Drivingly connected to an end of the second joint assembly 116, opposite the first propeller shaft 110, is a second propeller shaft 118. The second propeller shaft 118 drivingly connects the transmission 104 to a forward tandem axle system 120 of a tandem axle system 122 having an inter-axle differential 124. As illustrated in FIG. 1 of the disclosure and as a non-limiting example, at least a portion of a first end portion 124 of the second propeller shaft 118 may be drivingly connected to an end of the second joint assembly 116 opposite the first propeller shaft 110.

At least a portion of a second end portion 126 of the second propeller shaft 118 may be drivingly connected to an end of a third joint assembly 128. As a non-limiting example, the third joint assembly 128 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the third joint assembly 128 may include a bearing cup assembly according to an embodiment of the disclosure.

Drivingly connected to an end of the third joint assembly 128, opposite the second propeller shaft 118, is an end of a forward tandem axle system input shaft 130. An end of the forward tandem axle system input shaft 130, opposite the second propeller shaft 118, is drivingly connected to at least a portion of the inter-axle differential 124 of the forward tandem axle system 120. As a non-limiting example, the forward tandem axle system input shaft 130 may be an inter-axle differential input shaft, a coupling shaft, stub shaft or an inter-axle differential pinion shaft. The inter-axle differential 124 is a device that divides the rotational power generated by the engine 104 between the axles in a vehicle 100. The rotational power is transmitted through the forward tandem axle system 120 as described in more detail below.

As illustrated in FIG. 1 of the disclosure and as a non-limiting example, the inter-axle differential 124 is drivingly connected to a forward tandem axle differential 132 and a forward tandem axle system output shaft 134. The forward tandem axle differential 132 is a set of gears that allows the outer drive wheel(s) of a wheeled vehicle to rotate at a faster rate than the inner drive wheel(s).

The forward tandem axle system 120 further includes a first forward tandem axle half shaft 136 and a second front tandem axle half shaft 138. The first forward tandem axle half shaft 136 extends substantially perpendicular to the forward tandem axle system input shaft 130. At least a portion of a first end portion 140 of the first forward tandem axle half shaft 136 may be drivingly connected to a first forward tandem axle wheel assembly 142 and at least a portion of a second end portion 144 of the first forward tandem axle half shaft 136 may be drivingly connected to an end of the forward tandem axle differential 132. As a non-limiting example, the second end portion 144 of the first forward tandem axle half shaft 136 may be drivingly connected to a forward tandem axle differential side gear, a separate stub shaft, a separate coupling shaft, a first forward tandem axle differential output shaft and/or a shaft that is formed as part of a forward tandem axle differential side gear.

According to an embodiment of the disclosure and as a non-limiting example, at least a portion of the first end portion 140 of the first forward tandem axle half shaft 136 may be drivingly connected to at least a portion of a fourth joint assembly 145. The fourth joint assembly 145 may be used in order to drivingly connect at least a portion of the first end portion 140 of the first forward tandem axle half shaft 136 to at least a portion of the first forward tandem axle wheel assembly 142 of the vehicle 100. As a non-limiting example, the fourth joint assembly 145 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the fourth joint assembly 145 may include a bearing cup assembly according to an embodiment of the disclosure.

In accordance with a further embodiment of the disclosure and as a non-limiting example, at least a portion of the second end portion 144 of the first forward tandem axle half shaft 136 may be drivingly connected to at least a portion of a fifth joint assembly 147. The fifth joint assembly 147 may be used in order to drivingly connect at least a portion of the second end portion 144 of the first forward tandem axle half shaft 136 to at least a portion of the forward tandem axle differential 132 of the vehicle 100. As a non-limiting example, the fifth joint assembly 147 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the fifth joint assembly 147 may include a bearing cup assembly according to an embodiment of the disclosure.

Extending substantially perpendicular to the forward tandem axle input shaft 130 is the second front tandem axle half shaft 138. At least a portion of a first end portion 146 of the second forward tandem axle half shaft 138 may be drivingly connected to a second forward tandem axle wheel assembly 148. At least a portion of a second end portion 150 of the second forward tandem axle half shaft 138 may be drivingly connected to an end of the forward tandem axle differential 132 opposite the first forward tandem axle half shaft 136. As a non-limiting example, the second end portion 150 of the second forward tandem axle half shaft 138 may be drivingly connected to a forward tandem axle differential side gear, a separate stub shaft, a separate coupling shaft, a second forward tandem axle differential output shaft and/or a shaft that is formed as part of a forward tandem axle differential side gear.

According to an embodiment of the disclosure and as a non-limiting example, at least a portion of the first end portion 146 of the second forward tandem axle half shaft 138 may be drivingly connected to at least a portion of a sixth joint assembly 151. The sixth joint assembly 151 may be used in order to drivingly connect at least a portion of the first end portion 146 of the second forward tandem axle half shaft 138 to at least a portion of the second forward tandem axle wheel assembly 148 of the vehicle 100. As a non-limiting example, the sixth joint assembly 151 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the sixth joint assembly 151 may include a bearing cup assembly according to an embodiment of the disclosure.

In accordance with a further embodiment of the disclosure and as a non-limiting example, at least a portion of the second end portion 150 of the second forward tandem axle half shaft 138 may be drivingly connected to at least a portion of a seventh joint assembly 153. The seventh joint assembly 153 may be used in order to drivingly connect at least a portion of the second end portion 150 of the second forward tandem axle half shaft 138 to at least a portion of the forward tandem axle differential 132 of the vehicle 100 opposite the first forward tandem axle half shaft 136. As a non-limiting example, the seventh joint assembly 153 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the seventh joint assembly 153 may be connected to at least a portion of a clutch assembly (not shown) according to an embodiment of the disclosure. It is within the scope of this disclosure and as a non-limiting example that the seventh joint assembly 153 may include a bearing cup assembly according to an embodiment of the disclosure.

One end of the forward tandem axle system output shaft 134 is drivingly connected to a side of the inter-axle differential 124 opposite the second propeller shaft 118. An end of the forward tandem axle system output shaft 134, opposite the inter-axle differential 124, may be drivingly connected to at least a portion of a first end portion 152 of a third propeller shaft 154 via an eighth joint assembly 156. As a non-limiting example, the eighth joint assembly 156 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the eighth joint assembly 156 may include a bearing cup assembly according to an embodiment of the disclosure.

At least a portion of a second end portion 158 of the third propeller shaft 154 may be drivingly connected to a fourth propeller shaft 160 via a ninth joint assembly 162. As a non-limiting example, the ninth joint assembly 162 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the ninth joint assembly 162 may include a bearing cup assembly according to an embodiment of the disclosure.

As illustrated in FIG. 1 of the disclosure and as a non-limiting example, at least a portion of a first end portion 164 of the fourth propeller shaft 160 may be drivingly connected to an end of the ninth joint assembly 162 opposite the third propeller shaft 154. The fourth propeller shaft 160 drivingly connects the inter-axle differential 124 to a rear tandem axle system 166 having a rear tandem axle differential 168.

Additionally, as illustrated in FIG. 1 of the disclosure and as a non-limiting example, at least a portion of a second end portion 170 of the fourth propeller shaft 160 may be drivingly connected to an end of a tenth joint assembly 172. As a non-limiting example, the tenth joint assembly 172 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the tenth joint assembly 172 may include a bearing cup assembly according to an embodiment of the disclosure.

Drivingly connected to an end of the tenth joint assembly 172, opposite the fourth propeller shaft 160 is an end of a rear tandem axle system input shaft 174. As a non-limiting example, the rear tandem axle input shaft 174 may be a rear tandem axle differential input shaft, a coupling shaft, stub shaft or a rear tandem axle differential pinion shaft. Drivingly connected to an end of the rear tandem axle input shaft 174, opposite the fourth propeller shaft 160, is the rear tandem axle differential 168. The rear tandem axle differential 168 is a set of gears that allows the outer drive wheel(s) of the wheeled vehicle to rotate at a faster rate that the inner drive wheel(s). The rotational power is transmitted through the rear tandem axle system 166 as described in more detail below.

The rear tandem axle system 166 further includes a first rear tandem axle half shaft 176 and a second rear tandem axle half shaft 178. The first rear tandem axle half shaft 176 extends substantially perpendicular to the rear tandem axle system input shaft 174. At least a portion of a first end portion 180 of the first rear tandem axle half shaft 176 may be drivingly connected to a first rear tandem axle wheel assembly 182 and at least a portion of a second end portion 184 of the first rear tandem axle half shaft 176 may be drivingly connected to an end of the rear tandem axle differential 168. As a non-limiting example, the second end portion 184 of the first rear tandem axle half shaft 176 may be drivingly connected to a rear tandem axle differential side gear, a separate stub shaft, a separate coupling shaft, a first rear tandem axle differential output shaft and/or a shaft that is formed as part of a rear tandem axle differential side gear.

According to an embodiment of the disclosure and as a non-limiting example, at least a portion of the first end portion 180 of the first rear tandem axle half shaft 176 may be drivingly connected to at least a portion of an eleventh joint assembly 185. The eleventh joint assembly 185 may be used in order to drivingly connect at least a portion of the first end portion 180 of the first rear tandem axle half shaft 176 to at least a portion of the first rear tandem axle wheel assembly 182 of the vehicle 100. As a non-limiting example, the eleventh joint assembly 185 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the eleventh joint assembly 185 may include a bearing cup assembly according to an embodiment of the disclosure.

In accordance with a further embodiment of the disclosure and as a non-limiting example, at least a portion of the second end portion 184 of the first rear tandem axle half shaft 176 may be drivingly connected to at least a portion of a twelfth joint assembly 187. The twelfth joint assembly 187 may be used in order to drivingly connect at least a portion of the second end portion 184 of the first rear tandem axle half shaft 176 to at least a portion of the rear tandem axle differential 168 of the vehicle 100. As a non-limiting example, the twelfth joint assembly 187 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the twelfth joint assembly 187 may include a bearing cup assembly according to an embodiment of the disclosure.

Extending substantially perpendicular to the rear tandem axle system input shaft 174 is the second forward tandem axle half shaft 178. At least a portion of a first end portion 186 of the second rear tandem axle half shaft 178 may be drivingly connected to a second rear tandem axle wheel assembly 188. Additionally, at least a portion of a second end portion 190 of the second rear tandem axle half shaft 178 may be drivingly connected to an end of the rear tandem axle differential 168 opposite the first rear tandem axle half shaft 176. As a non-limiting example, the second end portion 190 of the second rear tandem axle half shaft 178 may be drivingly connected to a rear tandem axle differential side gear, a separate stub shaft, a separate coupling shaft, a second rear tandem axle differential output shaft and/or a shaft that is formed as part of a rear tandem axle differential side gear.

According to an embodiment of the disclosure and as a non-limiting example, at least a portion of the first end portion 186 of the second rear tandem axle half shaft 178 may be drivingly connected to at least a portion of a thirteenth joint assembly 192. The thirteenth joint assembly 192 may be used in order to drivingly connect at least a portion of the first end portion 186 of the second rear tandem axle half shaft 178 to at least a portion of the second rear tandem axle wheel assembly 188 of the vehicle 100. As a non-limiting example, the thirteenth joint assembly 192 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the thirteenth joint assembly 192 may include a bearing cup assembly according to an embodiment of the disclosure.

In accordance with a further embodiment of the disclosure and as a non-limiting example, at least a portion of the second end portion 190 of the second rear tandem axle half shaft 178 may be drivingly connected to at least a portion of a fourteenth joint assembly 194. The fourteenth joint assembly 194 may be used in order to drivingly connect at least a portion of the second end portion 190 of the second rear tandem axle half shaft 178 to at least a portion of the rear tandem axle differential 168 of the vehicle 100 opposite the first rear tandem axle half shaft 176. As a non-limiting example, the fourteenth joint assembly 194 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the first joint assembly 112 may include a bearing cup assembly according to an embodiment of the disclosure.

Figure 2:
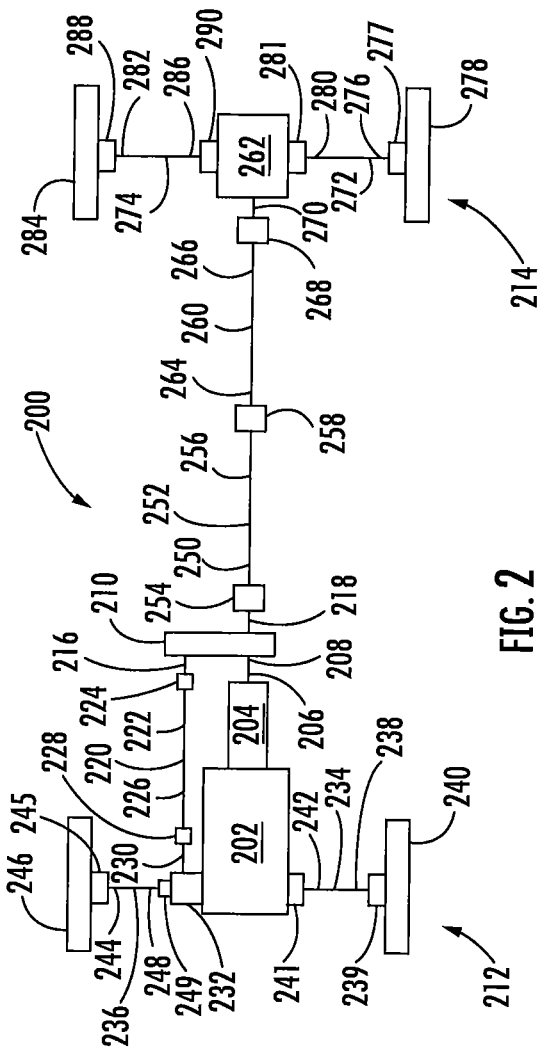
FIG. 2 is a schematic top-plan view of another vehicle having one or more joint assemblies according to an embodiment of the disclosure.

FIG. 2 is a schematic top-plan view of another vehicle 200 having one or more rotating shafts that are balanced according to an embodiment of the disclosure. The vehicle 200 has an engine 202, which is drivingly connected to a transmission 204. A transmission output shaft 206 is then drivingly connected to an end of the transmission 204 opposite the engine 202. The transmission 204 is a power management system which provides controlled application of the rotational energy generated by the engine 202 by means of a gearbox.

The transmission output shaft 206 is drivingly connected to a transfer case input shaft 208 which in turn is drivingly connected to a transfer case 210. The transfer case 210 is used to transfer the rotational power from the transmission 204 to a front axle system 212 and a rear axle system 214 by utilizing a series of gears and drive shafts. The transfer case 210 further includes a first transfer case output 216 shaft and a second transfer case output shaft 218.

A first propeller shaft 220 extends from the first transfer case output shaft 216 toward the front axle system 212 of the vehicle 200. At least a portion of a first end portion 222 of the first propeller shaft 220 may be drivingly connected to an end of the first transfer case output shaft 216 opposite the transfer case 210 via a first joint assembly 224. As a non-limiting example, the first joint assembly 224 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the first joint assembly 224 may include a bearing cup assembly according to an embodiment of the disclosure.

As illustrated in FIG. 2 of the disclosure and as a non-limiting example, at least a portion of a second end portion 226 of the first propeller shaft 220 may be drivingly connected to a second joint assembly 228. As a non-limiting example, the second joint assembly 228 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the second joint assembly 228 may include a bearing cup assembly according to an embodiment of the disclosure.

Drivingly connected to an end of the second joint assembly 228, opposite the first propeller shaft 220, is an end of a front axle system input shaft 230. As a non-limiting example, the front axle system input shaft 230 may be a front axle differential input shaft, a coupling shaft, stub shaft or a front axle differential pinion shaft. Drivingly connected to an end of the front axle system input shaft 230, opposite the first propeller shaft 220, is a front axle differential 232. The front axle differential 232 is a set of gears that allows the outer drive wheel(s) of the wheeled vehicle to rotate at a faster rate that the inner drive wheel(s). The rotational power is transmitted through the front axle system 212 as described in more detail below.

The front axle system 212 further includes a first front axle half shaft 234 and a second front axle half shaft 236. The first front axle half shaft 234 extends substantially perpendicular to the front axle system input shaft 230. At least a portion of a first end portion 238 of the first front axle half shaft 234 may be drivingly connected to a first front axle wheel assembly 240 and at least a portion of a second end portion 242 of the first front axle half shaft 234 may be drivingly connected to an end of the front axle differential 232. As a non-limiting example, the second end portion 242 of the first front axle half shaft 234 may be drivingly connected to a front axle differential side gear, a separate stub shaft, a separate coupling shaft, a first front axle differential output shaft and/or a shaft that is formed as part of a front axle differential side gear.

According to an embodiment of the disclosure and as a non-limiting example, at least a portion of the first end portion 238 of the first front axle half shaft 234 may be drivingly connected to at least a portion of a third joint assembly 239. The third joint assembly 239 may be used in order to drivingly connect at least a portion of the first end portion 238 of the first front axle half shaft 234 to at least a portion of the first front axle wheel assembly 240 of the vehicle 200. As a non-limiting example, the third joint assembly 239 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the first joint assembly 112 may include a bearing cup assembly according to an embodiment of the disclosure.

In accordance with a further embodiment of the disclosure and as a non-limiting example, at least a portion of the second end portion 242 of the first front axle half shaft 234 may be drivingly connected to at least a portion of a fourth joint assembly 241. The fourth joint assembly 241 may be used in order to drivingly connect at least a portion of the second end portion 242 of the first front axle half shaft 234 to at least a portion of the front axle differential 232 of the vehicle 200. As a non-limiting example, the fourth joint assembly 241 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the first joint assembly 112 may include a bearing cup assembly according to an embodiment of the disclosure.

Extending substantially perpendicular to the front axle system input shaft 230 is the second front axle half shaft 236. At least a portion of a first end portion 244 of the second front axle half shaft 236 may be drivingly connected to a second front axle wheel assembly 246. Additionally, at least a portion of a second end portion 248 of the second front axle half shaft 236 may be drivingly connected to an end of the front axle differential 232 opposite the first front axle half shaft 234. As a non-limiting example, the second end portion 248 of the second front axle half shaft 236 may be drivingly connected to a front axle differential side gear, a separate stub shaft, a separate coupling shaft, a second front axle differential output shaft and/or a shaft that is formed as part of a front axle differential side gear.

According to an embodiment of the disclosure and as a non-limiting example, at least a portion of the first end portion 244 of the second front axle half shaft 236 may be drivingly connected to at least a portion of a fifth joint assembly 245. The fifth joint assembly 245 may be used in order to drivingly connect at least a portion of the first end portion 244 of the second front axle half shaft 236 to at least a portion of the second front axle wheel assembly 246 of the vehicle 200. As a non-limiting example, the fifth joint assembly 245 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the fifth joint assembly 245 may include a bearing cup assembly according to an embodiment of the disclosure.

In accordance with a further embodiment of the disclosure and as a non-limiting example, at least a portion of the second end portion 248 of the second front axle half shaft 236 may be drivingly connected to at least a portion of a sixth joint assembly 249. The sixth joint assembly 249 may be used in order to drivingly connect at least a portion of the second end portion 248 of the second front axle half shaft 236 to at least a portion of the front axle differential 232 of the vehicle 200 opposite the first front axle half shaft 234. As a non-limiting example, the sixth joint assembly 249 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the sixth joint assembly 249 may include a bearing cup assembly according to an embodiment of the disclosure.

An end of the second transfer case output shaft 218 is drivingly connected to an end of the transfer case 210 opposite the transfer case input shaft 208. As illustrated in FIG. 2 of the disclosure and as a non-limiting example, at least a portion of a first end portion 250 of a second propeller shaft 252 may be drivingly connected to an end of the second transfer case output shaft 218 opposite the transfer case 210 via a seventh joint assembly 254. As non-limiting example, the seventh joint assembly 254 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the seventh joint assembly 254 may include a bearing cup assembly according to an embodiment of the disclosure.

As best seen in FIG. 2 of the disclosure and as a non-limiting example, at least a portion of a second end portion 256 of the second propeller shaft 252 may be drivingly connected to an eighth joint assembly 258. As a non-limiting example, the eighth joint assembly 258 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the eighth joint assembly 258 may include a bearing cup assembly according to an embodiment of the disclosure.

Drivingly connected to an end of the eighth joint assembly 258, opposite the second propeller shaft 252, is a third propeller shaft 260. The third propeller shaft 260 drivingly connects the transfer case 210 to a rear axle differential 262 of the rear axle system 214. As illustrated in FIG. 2 of the disclosure and as a non-limiting example, at least a portion of a first end portion 264 of the third propeller shaft 260 may be drivingly connected to an end of the eighth joint assembly 258 opposite the second propeller shaft 252.

At least a portion of a second end portion 266 of the third propeller shaft 260 may be drivingly connected to an end of a ninth joint assembly 268. As a non-limiting example, the ninth joint assembly 268 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the ninth joint assembly 268 may include a bearing cup assembly according to an embodiment of the disclosure.

Drivingly connected to an end of the ninth joint assembly 268, opposite the third propeller shaft 260, is an end of a rear axle system input shaft 270. An end of the rear axle system input shaft 270, opposite the third propeller shaft 260, is drivingly connected to the rear differential 262 of the rear axle system 214. As a non-limiting example, the rear axle system input shaft 270 may be a rear differential input shaft, a coupling shaft, stub shaft or a rear axle differential pinion shaft. The rear axle differential 262 is a set of gears that allows the outer drive wheel(s) of the wheeled vehicle to rotate at a faster rate that the inner drive wheel(s). The rotational power is transmitted through the rear axle system 214 as described in more detail below.

The rear axle system 214 further includes a first rear axle half shaft 272 and a second rear axle half shaft 274. The first rear axle half shaft 272 extends substantially perpendicular to the rear axle system input shaft 270. At least a portion of a first end portion 276 of the first rear axle half shaft 272 may be drivingly connected to a first rear axle wheel assembly 278 and at least a portion of a second end portion 280 of the first rear axle half shaft 272 may be drivingly connected to an end of the rear axle differential 262. As a non-limiting example, the second end portion 280 of the first rear axle half shaft 272 may be drivingly connected to a rear axle differential side gear, a separate stub shaft, a separate coupling shaft, a first rear axle differential output shaft and/or a shaft that is formed as part of a rear axle differential side gear.

According to an embodiment of the disclosure and as a non-limiting example, at least a portion of the first end portion 276 of the first rear axle half shaft 272 may be drivingly connected to at least a portion of a tenth joint assembly 277. The tenth joint assembly 277 may be used in order to drivingly connect at least a portion of the first end portion 276 of the first rear axle half shaft 272 to at least a portion of the first rear axle wheel assembly 278 of the vehicle 200. As a non-limiting example, the tenth joint assembly 277 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the tenth joint assembly 277 may include a bearing cup assembly according to an embodiment of the disclosure.

In accordance with a further embodiment of the disclosure and as a non-limiting example, at least a portion of the second end portion 280 of the first rear axle half shaft 272 may be drivingly connected to at least a portion of an eleventh joint assembly 281. The eleventh joint assembly 281 may be used in order to drivingly connect at least a portion of the second end portion 280 of the first rear axle half shaft 272 to at least a portion of the rear axle differential 262 of the vehicle 200. As a non-limiting example, the eleventh joint assembly 281 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the eleventh joint assembly 281 may include a bearing cup assembly according to an embodiment of the disclosure.

Extending substantially perpendicular to the rear axle system input shaft 270 is the second rear axle half shaft 274. At least a portion of a first end portion 282 of the second rear axle half shaft 274 may be drivingly connected to a second rear axle wheel assembly 284. Additionally, at least a portion of a second end portion 286 of the second rear axle half shaft 274 may be drivingly connected to an end of the rear axle differential 262 opposite the first rear axle half shaft 272. As a non-limiting example, the second end portion 286 of the second rear axle half shaft 274 may be drivingly connected to a rear axle differential side gear, a separate stub shaft, a separate coupling shaft, a second rear axle differential output shaft and/or a shaft that is formed as part of a rear axle differential side gear.

According to an embodiment of the disclosure and as a non-limiting example, at least a portion of the first end portion 282 of the second rear axle half shaft 274 may be drivingly connected to at least a portion of a twelfth joint assembly 288. The twelfth joint assembly 288 may be used in order to drivingly connect at least a portion of the first end portion 282 of the second rear axle half shaft 274 to at least a portion of the second rear axle wheel assembly 284 of the vehicle 200. As a non-limiting example, the twelfth joint assembly 288 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the twelfth joint assembly 288 may include a bearing cup assembly according to an embodiment of the disclosure.

In accordance with a further embodiment of the disclosure and as a non-limiting example, at least a portion of the second end portion 286 of the second rear axle half shaft 274 may be drivingly connected to at least a portion of a thirteenth joint assembly 290. The thirteenth joint assembly 290 may be used in order to drivingly connect at least a portion of the second end portion 286 of the second rear axle half shaft 274 to at least a portion of the rear axle differential 262 of the vehicle 200 opposite the first rear axle half shaft 272. As a non-limiting example, the thirteenth joint assembly 290 may be a homokinetic coupling assembly, a constant velocity joint assembly, a CV joint assembly, a universal joint assembly, a Cardan joint assembly, a Spicer joint assembly, a Hooke's joint assembly or a universal coupling assembly. It is within the scope of this disclosure and as a non-limiting example that the thirteenth joint assembly 290 may include a bearing cup assembly according to an embodiment of the disclosure.

FIGS. 3-3C provide a schematic illustration of a joint assembly 300 according to an embodiment of the disclosure. As best seen in FIG. 3 of the disclosure and as a non-limiting example, the joint assembly 300 includes a first joint member 302 that is drivingly connected to a second joint member 304 via one or more third joint members 306. In accordance with the embodiment illustrated in FIG. 3 of the disclosure and as a non-limiting example, the first joint member 302 may be a first yoke member, the second joint member 304 may be a second yoke member, and the one or more third joint members 306 may be one or more trunnions. As a result, it is within the scope of this disclosure and as a non-limiting example that the joint assembly 300 may be a universal joint assembly, a universal coupling assembly, a Spicer joint assembly, a Hooke's joint assembly or a U-joint assembly.

The first joint member 302 has a first end portion 308 and a second end portion 310. Connected to at least a portion of the first end portion 308 of the first joint member 302 is a first shaft 312. It is within the scope of this disclosure and as a non-limiting example that the first shaft 312 may be a propeller shaft, a prop shaft, a drive shaft, or a stub shaft. Additionally, it is within the scope of this disclosure and as a non-limiting example that the first joint member 302 may be integrally formed as part of an end of the first shaft 312, may be drivingly connected to at least a portion of the end of the first shaft 312, or may be integrally connected to at least a portion of the end of the first shaft 312.

Extending outward from at least a portion of the second end portion 310 of the first joint member 302 is one or more yoke arms 320 having one or more yoke arm apertures 322 therein. The one or more yoke arm apertures 322 in the one or more yoke arms 320 of the first joint member 302 may be of a size and shape to receive and/or retain at least a portion of one or more trunnions 324 extending outward from a body portion 326 of the one or more third joint members 306.

In accordance with the embodiment illustrated in FIG. 3 of the disclosure and as a non-limiting example, the second joint member 304 has a first end portion 314 and a second end portion 316. Connected to at least a portion of the second end portion 316 of the second joint member 304 is a second shaft 318. It is within the scope of this disclosure and as a non-limiting example that the second shaft 318 may be a propeller shaft, a prop shaft, a drive shaft, or a stub shaft. Additionally, it is within the scope of this disclosure and as a non-limiting example that the second joint member 304 may be integrally formed as part of an end of the second shaft 318, may be drivingly connected to at least a portion of the end of the second shaft 318, or may be integrally connected to at least a portion of the end of the second shaft 318.

Extending outward from at least a portion of the first end portion 314 of the second joint member 304 is one or more yoke arms 328 having one or more yoke arm apertures 330 therein. The one or more yoke arm apertures 330 in the one or more yoke arms 328 of the second joint member 304 may be of a size and shape to receive and/or retain at least a portion of the one or more trunnions 324 extending outward from the body portion 326 of the one or more third joint members 306.

As best seen in FIG. 3A and as a non-limiting example, the joint assembly 300 may include one or more bearing cup assemblies 332. At least a portion of the one or more bearing cup assemblies 332 may be interposed between an outer surface 334 of the one or more trunnions 324 of the one or more third joint members 306 and a surface defining the one or more yoke arm apertures 322 and 330 in the one or more yoke arms 320 and 328 of the first and second joint members 302 and 304. The one or more bearing cup assemblies 332 aid in allowing the one or more third joint members 306 to rotate relative to the first and second joint members 302 and 304 when the joint assembly 300 is in operation. Additionally, it is to be understood that the one or more bearing cup assemblies 332 may be used in order to aid in drivingly connecting the one or more trunnions 324 of the one or more third joint members 306 to the first and second joint members 302 and 304 of the joint assembly 300.

According to the embodiment illustrated in FIG. 3 and as a non-limiting example, the one or more bearing cup assemblies 332 may include a bearing cup 336 having an outer surface 337, first end 338, a second end 340, a first end portion 342 and a second end portion 344. Extending inward from the outer surface 337 of the first end 338 of the bearing cup 336 is a receiving portion 346. The receiving portion 346 in the bearing cup 336 of the one or more bearing assemblies 332 may be of a size and shape to receive and/or retain at least a portion of the one or more trunnions 324 of the one or more third joint members 306 therein.

As best seen in FIG. 3A of the disclosure and as a non-limiting example, the receiving portion 346 in the bearing cup 336 may be defined by one or more side surfaces 348 and one or more bottom surfaces 350. The one or more side surfaces 348 of the receiving portion 346 may extend from the first end 338 of the bearing cup 336 toward the second end 340 of the bearing cup 336 and may terminate in the one or more bottom surfaces 350. As a result, it is therefore to be understood that the one or more bottom surfaces 350 may be disposed at an end of the one or more side surfaces 348 opposite the first end 338 of the bearing cup 336.

In accordance with the embodiment illustrated in FIG. 3 and as a non-limiting example, at least a portion of the one or more side surfaces 348 of the receiving portion 346 in the bearing cup 336 may extend inward at an angle θ1 toward the outer surface 334 of the one or more trunnions 324. As a result, the one or more side surfaces 348 of the receiving portion 346 may have diameter D1 that decreases from the first end portion 342 to the second end portion 344 of the bearing cup 336. It is therefore within the scope of this disclosure and as a non-limiting example that the receiving portion 346 in the bearing cup 336 may have a substantially frusto-conical shape.

At least a portion of the outer surface 334 of the one or more trunnions 324 of the one or more third joint members 306 may have a shape that is complementary to at least a portion of the one or more side surfaces 348 of the receiving portion 346 in the bearing cup 336. As a result, at least a portion of the outer surface 334 of the one or more trunnions 324 may extend at an angle θ2 away from the one or more side surfaces 348 of the receiving portion 346 in the bearing cup 336. The one or more trunnions 324 may therefore have a portion having a diameter D2 that is less than the diameter D1 of the one or more side surfaces 348 of the receiving portion 346 in the bearing cup 336. As best seen in FIG. 3 of the disclosure and as a non-limiting example, the diameter D2 of the one or more trunnions 324 may decrease toward an outermost end 352 of the one or more trunnions 324 of the one or more third joint members 306. It is therefore to be understood that at least a portion of the one or more trunnions 324 may have a substantially frusto-conical shape.

Interposed between at least a portion of the outer surface 334 of the one or more trunnions 324 and the one or more side surfaces 348 of the receiving portion 346 in the bearing cup 336 is one or more bearings 354 having an inner surface 356, and outer surface 358, a first end 360, and a second end 362. The one or more bearings 354 may be used in order to aid in allowing the bearing cup 336 and the one or more arms 320 and 328 of the first and second joint members 302 and 304 to rotate relative to the one or more third joint members 306 when the joint assembly 300 is in operation. As best seen in FIG. 3 of the disclosure and as a non-limiting example, at least a portion of the outer surface 358 of the one or more bearings 354 may be in direct contact with at least a portion of the one or more side surfaces 348 of the receiving portion 346 in the bearing cup 336. Additionally, at least a portion of the inner surface 356 of the one or more bearings 354 may be in direct contact with at least a portion of the outer surface 334 of the one or more trunnions 324 of the one or more third joint members 306.

The one or more bearings 354 may have a diameter D3 that is greater than the diameter D2 of the one or more trunnions 324 but less than the diameter D1 of the one or more side surfaces 348 of the receiving portion 346 in the bearing cup 336. As best seen in FIG. 3 and as a non-limiting example, the diameter D3 may decrease from the first end 360 to the second end 362 of the one or more bearings 345. It is therefore within the scope of this disclosure and as a non-limiting example that the one or more bearings 354 may be substantially frusto-conical in shape.

In accordance with the embodiment illustrated in FIG. 3C of the disclosure and as a non-limiting example, the one or more bearings 354 may be one or more bearing assemblies having an inner race 390, an outer race 392, a cage 394, and/or one or more rolling elements 396 interposed between the inner and outer races 390 and 392. In accordance with this embodiment and as a non-limiting example, at least a portion of the inner race 390 may be in direct contact with at least a portion of the outer surface 334 of the one or more trunnions 324 and at least a portion of the outer race 392 may be in direct contact with at least a portion of the one or more side surfaces 348 of the receiving portion 346 in the bearing cup 336. As a result, it is therefore within the scope of this disclosure and as a non-limiting example that the one or more bearings 354 may be on or more needle bearing assemblies, one or more tapered roller bearing assemblies, and/or one or more ball bearing assemblies.

According to an alternative embodiment of the disclosure and as a non-limiting example, the one or more bearings 354 may be one or more rolling elements 396 that are interposed between the outer surface 334 of the one or more trunnions 324 and the one or more side surfaces 348 of the receiving portion 346 in the bearing cup 336. It is within the scope of this disclosure and as a non-limiting example that the one or more rolling elements 396 of the one or more bearings 354 may be substantially spherical in shape and/or substantially cylindrical and/or substantially frusto-conical in shape.

As illustrated in FIGS. 3A and 3B of the disclosure and as a non-limiting example, the one or more bearing cup assemblies 332 may include one or more sealing members 364 that are sealingly engaged with at least a portion of the outer surface 334 of the one or more trunnions 324 of the one or more third joint members 306. The one or more sealing members 364 may be used in order to prevent the migration of dirt, debris, and/or moisture into the one or more bearing cup assemblies 332. Additionally, the one or more sealing members 364 may be used to prevent an amount of lubrication (not shown) from exiting the one or more bearing cup assemblies 332. In accordance with the embodiment illustrated in FIG. 3A of the disclosure and as a non-limiting example, the one or more sealing members 364 may have one or more apertures 380 therein having a size and shape to receive and/or retain at least a portion of the one or more trunnions 324 therein.

The one or more sealing members 364 may have one or more sealing portions 366 and/or one or more support portions 368. The one or more support portions 368 of the one or more sealing members 364 have a body portion 369 with an inner surface 370 an outer surface 372, a first end portion 374, and a second end portion 376. At least a portion of the body portion 369 of the one or more support portions 368 may be connected to at least a portion of the bearing cup 336 of the one or more bearing cup assemblies 332. It is within the scope of this disclosure and as a non-limiting example that the body portion 369 of the one or more support portions 368 may be connected to at least a portion of the one or more bearing cups 336 by using one or more welds, one or more mechanical fasteners, one or more adhesives, a threaded connection, an interference connection, and/or a press-fit connection.

As illustrated in FIG. 3 and as a non-limiting example, at least a portion of the outer surface 372 of the body portion 369 of the one or more support portions 368 of the one or more sealing members 364 may be in direct contact with and/or connected to at least a portion of the first end 338 of the bearing cup 336.

In accordance with the embodiment illustrated in FIGS. 3A and 3B and as a non-limiting example, the one or more support portions 368 may have one or more radially protruding portions 378 extending radially outward from at least a portion of the outer surface of the second end portion 376 of the one or more support portions 368. At least a portion of the one or more radially protruding portions 378 may extend into and may be disposed within at least a portion of the receiving portion 346 of the bearing cup 336.

It is within the scope of this disclosure and as a non-limiting example that at least a portion of the one or more radially protruding portions 378 of the one or more support portions 366 may be in direct contact with at least a portion of the one or more bearings 354 of the one or more bearing cup assemblies 332. As a result, the one or more support portions 368 of the one or more sealing members 364 may provide support for at least a portion of the one or more bearings 354 thereby preventing the one or more one or more bearings 354 from falling out of the one or more bearing cup assemblies 332 after being assembled and/or when in operation.

The one or more support portions 368 of the one or more sealing members 364 may include a transition portion 382 connecting the body portion 369 to the one or more radially protruding portions 378 of the one or more support portions 368. As best seen in FIGS. 3A and 3B and as a non-limiting example, at least a portion of the transition portion 382 of the one or more support members 368 may be in direct contact with and/or connected to at least a portion of the first end portion 342 of the one or more side surfaces 348 of the receiving portion 346 in the bearing cup 336. It is within the scope of this disclosure and as a non-limiting example that the transition portion 382 of the one or more support portions 368 may be connected to at least a portion of the one or more side surfaces 348 of the receiving portion 346 by using one or more welds, one or more mechanical fasteners, one or more adhesives, a threaded connection, an interference connection, and/or a press-fit connection.

According to an embodiment of the disclosure and as a non-limiting example, the first end portion 342 of the one or more side surfaces 348 of the receiving portion 346 may have a plurality of receiving portion threads 349 circumferentially extending thereon. The plurality of receiving portion threads 349 may be complementary to and selectively meshingly engagable with a plurality of sealing member threads 347 circumferentially extending along at least a portion of the outer surface 372 of the transition portion 382 of the one or more support portions 368 of the one or more sealing members 364. The meshing engagement between the plurality of sealing member threads 347 on the one or more support portions 368 of the one or more sealing members 364 and the plurality of receiving portion threads 349 on the one or more side surfaces 348 of the bearing cup 336 may aid in securing the one or more sealing members 364 relative to the bearing cup 336. Additionally, the meshing engagement between the plurality of sealing member threads 347 and the plurality of receiving portion threads 349 may aid in ensuring that the one or more sealing members 364 apply a pre-determined optimal pre-load force onto the one or more bearings 354 of the one or more bearing cup assemblies 332. Furthermore, the meshing engagement between the plurality of sealing member threads 347 and the plurality of receiving portion threads 349 may aid in ensuring that the one or more sealing members 364 are installed in their pre-determined optimal operating positions. Still further, meshing engagement between the plurality of sealing member threads 347 and the plurality of receiving portion threads 349 may aid in ensuring that the one or more sealing portions 366 are sealingly engaged with at least a portion of the outer surface 334 of the one or more trunnions 324 of the joint assembly 300.

At least a portion of the one or more sealing portions 366 of the one or more sealing members 364 may be integrally connected to or integrally formed as part of at least a portion of the inner surface 370 of the body portion 369 of the one or more support portions 368. In accordance with the embodiment illustrated in FIGS. 3A and 3B and as a non-limiting example, the one or more sealing portions 366 may have one or more sealing arms 386. The one or more sealing arms 386 may extend outward from an outer surface 388 of the one or more sealing portions 366 toward the outer surface 334 of the one or more trunnions 324 of the one or more third joint members 306. When assembled, at least a portion of the one or more sealing arms 386 of the one or more sealing portions 366 may be elastically deformed by the outer surface 334 of the one or more trunnions 324 providing a sealing engagement between the one or more sealing members 364 and the one or more trunnions 324. It is therefore to be understood that the one or more sealing arms 386 aid in preventing an amount of dirt, debris, and/or moisture from migrating into the one or more bearing cup assemblies 332.

As a result of this arrangement, the one or more bearings 354 are able to support the loads experienced in both the axial and tangential planes when the one or more bearing cup assemblies 332 are in operation. Additionally, as a result of this arrangement, the thrust washers typically used in a bearing cup assembly are able to be eliminated, thereby reducing the overall weight, cost, assembly time, and/or complexity associated with the one or more bearing cup assemblies 332. Furthermore, as a result of this arrangement, the overall coefficient of friction and frictional losses experienced by the one or more bearing cup assemblies 332 is reduced, the overall efficiency of the joint assembly 300 is increased, the overall life and durability of the joint assembly 300 and the one or more beating cup assemblies 332 is increased, and the pre-load is easier to set.

By utilizing the one or more bearing cup assemblies 332 within the joint assembly 300, it provides the joint assembly 300 with a reduced overall coefficient of friction, an improved flex effort, an improved overall balancing, a reduced complexity, a reduced weight and is more cost efficient. Additionally, the one or more bearing cup assemblies 332 provides a universal joint assembly 300 that is more efficient and has an increased overall life and durability.

FIGS. 4 and 4A provide a schematic illustration of a joint assembly 400 having one or more bearing cup assemblies 402 according to an alternative embodiment of the disclosure. The joint assembly 400 and the one or more bearing cup assemblies 402 illustrated in FIGS. 4 and 4A of the disclosure are the same as the joint assembly 300 and the one or more bearing cup assemblies 332 illustrated in FIGS. 3-3B, except where specifically noted below. In accordance with the embodiment illustrated in FIGS. 4 and 4A of the disclosure and as a non-limiting example the joint assembly 400 may be a universal joint assembly, a universal coupling assembly, a Spicer joint assembly, a Hooke's joint assembly or a U-joint assembly.

As best seen in FIG. 4 of the disclosure and as a non-limiting example, the one or more bearing cup assemblies 402 of the joint assembly 400 may include a bearing cup 404 having the receiving portion 346 therein. The receiving portion 346 may have one or more side surfaces 406 extending from a first end 338 of the bearing cup 404 and terminating in the one or more bottom surfaces 350. The first end portion 342 of the one or more side surfaces 406 may include one or more sealing member attachment surfaces 408. At least a portion of the one or more support portions 368 of the one or more sealing members 364 may be in direct contact with and/or connected to at least a portion of the one or more sealing member attachment surfaces 408 of the one or more side surfaces 406 of the receiving portion 346 in the one or more bearing cup assemblies 402. It is within the scope of this disclosure and as a non-limiting example, that the one or more support portions 386 of the one or more sealing members 364 may be connected to at least a portion of the one or more sealing member attachment surfaces 408 of the one or more side surfaces 406 of the receiving portion 346 by using one or more welds, one or more mechanical fasteners, one or more adhesives, a threaded connection, an interference connection, and/or a press-fit connection. As a non-limiting example, the one or more sealing member attachment surfaces 408 may extend substantially perpendicular to at least a portion of the first end 338 of the bearing cup 404. Additionally, as a non-limiting example, the one or more sealing member attachment surfaces 408 may be substantially cylindrical in shape.

In accordance with the embodiment where the one or more support members 368 have the plurality of sealing member threads 347, the one or more sealing member attachment surfaces 408 may have a plurality of receiving portion threads 349 thereon. The plurality of receiving portion threads 349 may be complementary to and selectively meshingly engaged with the plurality of sealing member threads 347. The meshing engagement between the plurality of sealing member threads 347 on the one or more support portions 368 of the one or more sealing members 364 and the plurality of receiving portion threads 349 on the one or more sealing member attachment surfaces 408 of the bearing cup 404 may aid in securing the one or more sealing members 364 relative to the bearing cup 404. Additionally, the meshing engagement between the plurality of sealing member threads 347 and the plurality of receiving portion threads 349 may aid in ensuring that the one or more sealing members 364 apply a pre-determined optimal pre-load force onto the one or more bearings 354 of the one or more bearing cup assemblies 402. Furthermore, the meshing engagement between the plurality of sealing member threads 347 and the plurality of receiving portion threads 349 may aid in ensuring that the one or more sealing members 364 are installed in their pre-determined optimal operating positions. Still further, meshing engagement between the plurality of sealing member threads 347 and the plurality of receiving portion threads 349 may aid in ensuring that the one or more sealing portions 366 are sealingly engaged with at least a portion of the outer surface 334 of the one or more trunnions 324 of the joint assembly 400.

The one or more side surfaces 406 of the receiving portion 346 may include one or more substantially arcuate portions 410 thereon. As best seen in FIG. 4 of the disclosure and as a non-limiting example, at least a portion of the one or more substantially arcuate portions 410 of the one or more side surfaces 406 may extend inward toward the one or more trunnions 324 of the one or more third joint members 306 of the joint assembly 400. It is within the scope of this disclosure and as a non-limiting example, that the one or more substantially arcuate portions 410 of the one or more side surfaces 406 of the receiving portion 346 in the bearing cup 404 may be substantially concave and/or substantially convex in shape.

As illustrated in FIG. 4 and as a non-limiting example, the one or more substantially arcuate portions 410 of the one or more side surfaces 406 may a first portion 414 with a diameter D4 that increases and a second portion 416 with a diameter D5 that decreases. As a result, it is therefore to be understood that the one or more substantially arcuate portions 410 of the one or more side surfaces 406 may have an inner most portion 412. When the one or more bearing cup assemblies 402 are assembled, at least a portion of the inner most portion 412 of the one or more arcuate portions 410 may be indirect contact with at least a portion of the one or more bearings 354. It is within the scope of this disclosure and as a non-limiting example that the diameters D4 and D5 of the one or more substantially arcuate portions 410 may increase and decrease at the same or different rates relative to each other.

In accordance with the embodiment where the one or more bearings 354 have an outer race 392, at least a portion of the inner most portion 412 of the one or more substantially arcuate portions 410 may be in direct contact with at least a portion of the outer race 392 of the one or more bearings 354.

As a result of this arrangement, the one or more bearings 354 are able to support the loads experienced in both the axial and tangential planes when the one or more bearing cup assemblies 402 are in operation. Additionally, as a result of this arrangement, the thrust washers typically used in a bearing cup assembly are able to be eliminated, thereby reducing the overall weight, cost, assembly time, and/or complexity associated with the one or more bearing cup assemblies 402. Furthermore, as a result of this arrangement, the overall coefficient of friction and frictional losses experienced by the one or more bearing cup assemblies 402 is reduced, the overall efficiency of the joint assembly 400 is increased, the overall life and durability of the joint assembly 400 and the one or more beating cup assemblies 402 is increased, and the pre-load is easier to set.

By utilizing the one or more bearing cup assemblies 402 within the joint assembly 400, it provides the joint assembly 400 with a reduced overall coefficient of friction, an improved flex effort, an improved overall balancing, a reduced complexity, a reduced weight and is more cost efficient. Additionally, the one or more bearing cup assemblies 402 provides a universal joint assembly 400 that is more efficient and has an increased overall life and durability.

FIGS. 5 and 5A provide a schematic illustration of a joint assembly 500 having one or more bearing cup assemblies 502 according to another embodiment of the disclosure. The joint assembly 500 and the one or more bearing cup assemblies 502 illustrated in FIGS. 5 and 5A of the disclosure are the same as the joint assembly 300 and 400 and the one or more bearing cup assemblies 332 and 402 illustrated in FIGS. 3-4A, except where specifically noted below. In accordance with the embodiment illustrated in FIGS. 5 and 5A of the disclosure and as a non-limiting example the joint assembly 500 may be a universal joint assembly, a universal coupling assembly, a Spicer joint assembly, a Hooke's joint assembly or a U-joint assembly.

As best seen in FIGS. 5 and 5A of the disclosure and as a non-limiting example, the one or more bearing cup assemblies 502 of the joint assembly 500 may include a bearing cup 504 having the receiving portion 346 therein. The receiving portion 346 may include the one or more side surfaces 348 and/or 406 extending from a first end 338 of the bearing cup 504 and terminating in the one or more bottom surfaces 350. The first end portion 342 of the one or more side surfaces 348 and/or 406 may include one or more protruding portions 506 extending inward toward the one or more trunnions 324 of the one or more third joint members 306 of the joint assembly 500. At least a portion of the one or more protruding portions 506 may be in direct contact with and/or connected to at least a portion of the support portion 368 of the one or more sealing members 364 of the one or more bearing cup assemblies 402. It is within the scope of this disclosure and as a non-limiting example, that the one or more support portions 386 of the one or more sealing members 364 may be connected to at least a portion of the one or more protruding portions 506 of the one or more side surfaces 348 and/or 406 of the receiving portion 346 by using one or more welds, one or more mechanical fasteners, one or more adhesives, a threaded connection, an interference connection, and/or a press-fit connection. As a non-limiting example, the one or more protruding portions 506 may extend substantially perpendicular to at least a portion of the first end 338 of the bearing cup 504.

In accordance with the embodiment where the one or more support members 368 have the plurality of sealing member threads 347, the one or more protruding portions 506 may have a plurality of receiving portion threads 349 thereon. The plurality of receiving portion threads 349 may be complementary to and selectively meshingly engaged with the plurality of sealing member threads 347. The meshing engagement between the plurality of sealing member threads 347 on the one or more support portions 368 of the one or more sealing members 364 and the plurality of receiving portion threads 349 on the one or more protruding portions 506 of the bearing cup 504 may aid in securing the one or more sealing members 364 relative to the bearing cup 504. Additionally, the meshing engagement between the plurality of sealing member threads 347 and the plurality of receiving portion threads 349 may aid in ensuring that the one or more sealing members 364 apply a pre-determined optimal pre-load force onto the one or more bearings 354 of the one or more bearing cup assemblies 502. Furthermore, the meshing engagement between the plurality of sealing member threads 347 and the plurality of receiving portion threads 349 may aid in ensuring that the one or more sealing members 364 are installed in their pre-determined optimal operating positions. Still further, meshing engagement between the plurality of sealing member threads 347 and the plurality of receiving portion threads 349 may aid in ensuring that the one or more sealing portions 366 are sealingly engaged with at least a portion of the outer surface 334 of the one or more trunnions 324 of the joint assembly 500.

According to an embodiment of the disclosure and as a non-limiting example, when the one or more bearings 354 are inserted within the receiving portion 346, at least a portion of the one or more bearings 354 may be in direct contact with at least a portion of the one or more protruding portions 506 of the one or more side surfaces 410. As a result, as the one or more bearings 354 are inserted within the receiving portion 346 in the bearing cup 504, the one or more portions 506 may elastically deform at least a portion of the one or more bearings 354. Once the one or more bearings 354 have traveled beyond the one or more protruding portions 506 within the receiving portions 346, at least a portion of the one or more bearings 354 may expand outward such that at least a portion of the one or more bearings 354 are disposed outward from and proximate to at least a portion of a surface 508. In accordance with the embodiment illustrated in FIG. 5A and as a non-limiting example, the surface 508 of the one or more protruding portions 506 connects the one or more protruding portions 506 to the one or more side surfaces 410 of the receiving portion 346 in the bearing cup 504. It is therefore to be understood that once the one or more bearings 354 are installed within the bearing cup 504, the one or more protruding portions 506 may provide a positive stop for and may prevent the one or more bearings 354 from coming out of the bearing cup 504 once installed. As a result, once installed, at least a portion of the first end 360 of the one or more bearings 354 may be in direct contact with at least a portion of the surface 508 of the one or more protruding portions 506.

The one or more protruding portions 506 may have a thickness T1 as illustrated in FIG. 5 of the disclosure. The thickness T1 of the one or more protruding portions 506 may a thickness needed to ensure that the one or more bearings 354 are retained in their pre-determined optimal operating positions once installed within the receiving portion 346 in the bearing cup 504.

In accordance with the embodiment where the one or more bearings 354 have an outer race 392, as the one or more bearings 354 are being installed within the receiving portion 346 in the bearing cup 504, the one or more protruding portions 506 may elastically deform at least a portion of the outer race 392. Once the outer race 392 has translated beyond the one or more protruding portions 506 within the receiving portion 346, at least a portion of the outer race 392 may expand outward such that at least a portion of the outer race 392 is disposed outward from and proximate to at least the portion of a surface 508 of the one or more protruding portions 506. It is therefore to be understood that once the one or more bearings 354 are installed within the bearing cup 504, the one or more protruding portions 506 may provide a positive stop for and may prevent the outer race 392 and the one or more bearings 354 from coming out of the bearing cup 504 once installed. As a result, once installed, at least a portion of the outer race 392 of the one or more bearings 354 may be in direct contact with at least a portion of the surface 508 of the one or more protruding portions 506.

The one or more bearing cup assemblies 502 may include one or more thrust members 514. At least a portion of the one or more thrust members 514 may be in direct contact with the outermost end 352 of the one or more trunnions 324 of the one or more third joint members 306 and the one or more bottom surfaces 350 of the receiving portion 346 in the bearing cup 504. The one or more thrust members 514 may aid in reducing the overall amount of friction between the one or more trunnions 324 and the bearing cup 504 when in operation. This aids in improving the overall life, durability, and efficiency associated with the joint assembly 500. It is within the scope of this disclosure and as a non-limiting example that the one or more thrust member 514 may be one or more thrust washers.

One or more spacer receiving portions 510 may extend inward into the bearing cup 504 from at least a portion of the second end portion 344 of the one or more side surfaces 348 and/or 406 of the receiving portion 346. As illustrated in FIG. 5 of the disclosure and as a non-limiting example, the one or more spacer receiving portions may extend outward away from the one or more trunnions 324 of the one or more third joint members 306 of the joint assembly 500. The one or more spacer receiving portions 510 in the one or more side surfaces 348 and/or 406 may be of a size and shape to received and/or retain at least a portion of a spacer 512 therein. The one or more spacers 512 may be used in order to aid in ensuring that the one or more bearings 354 and/or the one or more thrust members 514 are retained in their pre-determined operating positions at all times. As a result, at least a portion of the one or more bearings 354 and/or the one or more thrust members 514 may be in direct contact with at least a portion of the one or more spacers 512 of the one or more bearing cup assemblies 502.

As a result of this arrangement, the one or more bearings 354 are able to support the loads experienced in both the axial and tangential planes when the one or more bearing cup assemblies 502 are in operation. Additionally, as a result of this arrangement, the thrust washers typically used in a bearing cup assembly are able to be eliminated, thereby reducing the overall weight, cost, assembly time, and/or complexity associated with the one or more bearing cup assemblies 502. Furthermore, as a result of this arrangement, the overall coefficient of friction and frictional losses experienced by the one or more bearing cup assemblies 502 is reduced, the overall efficiency of the joint assembly 500 is increased, the overall life and durability of the joint assembly 500 and the one or more beating cup assemblies 502 is increased, and the pre-load is easier to set.

By utilizing the one or more bearing cup assemblies 502 within the joint assembly 500, it provides the joint assembly 500 with a reduced overall coefficient of friction, an improved flex effort, an improved overall balancing, a reduced complexity, a reduced weight and is more cost efficient. Additionally, the one or more bearing cup assemblies 502 provides a universal joint assembly 500 that is more efficient and has an increased overall life and durability.

FIGS. 6 and 6A provide a schematic illustration of a joint assembly 600 having one or more bearing cup assemblies 602 according to another embodiment of the disclosure. The joint assembly 600 and the one or more bearing cup assemblies 602 illustrated in FIGS. 6 and 6A of the disclosure are the same as the joint assembly 300, 400, and 500 and the one or more bearing cup assemblies 332, 402, and 502 illustrated in FIGS. 3-5A, except where specifically noted below. In accordance with the embodiment illustrated in FIGS. 6 and 6A of the disclosure and as a non-limiting example the joint assembly 600 may be a universal joint assembly, a universal coupling assembly, a Spicer joint assembly, a Hooke's joint assembly or a U-joint assembly.

As illustrated in FIGS. 6 and 6A of the disclosure and as a non-limiting example, the one or more side surfaces 348 of the receiving portion 346 may include one or more bearing receiving portions 606 therein. The one or more bearing receiving portions 606 in the bearing cup 604 may extend inward into the bearing cup 604 away from the one or more trunnions 324 of the one or more third joint members 306 of the joint assembly 600. The one or more bearing receiving portions 606 in the bearing cup 604 may be of a size and shape to receive and/or retain at least a portion of the one or more bearings 354 therein.

According to an embodiment of the disclosure and as a non-limiting example, when the one or more bearings 354 are inserted within the receiving portion 346, at least a portion of the one or more bearings 354 may be in direct contact with at least a portion of the first end portion 342 of the one or more side surfaces 348 of the receiving portion 348. As a result, as the one or more bearings 354 are inserted within the receiving portion 346 in the bearing cup 604, the first end portion 342 of the one or more side surfaces 348 may elastically deform at least a portion of the one or more bearings 354. Once the one or more bearings 354 have translated into alignment with the one or more bearing receiving portions 606 in the bearing cup 604, at least a portion of the one or more bearings 606 may expand outward such that at least a portion of the one or more bearings 354 are disposed within one or more bearing receiving portions 606. It is therefore to be understood that once the one or more bearings 354 are installed within the one or more bearing receiving portions 606 in the bearing cup 604, an end 608 of the one or more bearing receiving portions 606 may provide a positive stop for and may prevent the one or more bearings 354 from coming out of the bearing cup 604 once installed. As a result, once installed, at least a portion of the first end 360 of the one or more bearings 354 may be in direct contact with at least a portion of the end 608 of the one or more bearing receiving portions 606 in the bearing cup 604.

In accordance with the embodiment where the one or more bearings 354 have an outer race 392, as the one or more bearings 354 are being installed within the receiving portion 346 in the bearing cup 604, the first end portion 342 of the one or more side surfaces 348 may elastically deform at least a portion of the outer race 392. Once the outer race 392 is placed into alignment with the one or more bearing receiving portions 606 in the bearing cup 604, at least a portion of the outer race 392 of the one or more bearings 354 may expand outward such that at least a portion of the outer race 392 is disposed within one or more bearing receiving portions 606. It is therefore to be understood that once the one or more bearings 354 are installed within the one or more bearing receiving portions 606 in the bearing cup 604, the end 608 of the one or more bearing receiving portions 606 may provide a positive stop for and may prevent the one or more bearings 354 from coming out of the bearing cup 604 once installed. As a result, once installed, at least a portion of the outer race 392 of the one or more bearings 354 may be in direct contact with at least a portion of the end 608 of the one or more bearing receiving portions 606 in the bearing cup 604.

As a result of this arrangement, the one or more bearings 354 are able to support the loads experienced in both the axial and tangential planes when the one or more bearing cup assemblies 602 are in operation. Additionally, as a result of this arrangement, the thrust washers typically used in a bearing cup assembly are able to be eliminated, thereby reducing the overall weight, cost, assembly time, and/or complexity associated with the one or more bearing cup assemblies 602. Furthermore, as a result of this arrangement, the overall coefficient of friction and frictional losses experienced by the one or more bearing cup assemblies 602 is reduced, the overall efficiency of the joint assembly 600 is increased, the overall life and durability of the joint assembly 600 and the one or more beating cup assemblies 602 is increased, and the pre-load is easier to set.

By utilizing the one or more bearing cup assemblies 602 within the joint assembly 600, it provides the joint assembly 600 with a reduced overall coefficient of friction, an improved flex effort, an improved overall balancing, a reduced complexity, a reduced weight and is more cost efficient. Additionally, the one or more bearing cup assemblies 602 provides a universal joint assembly 600 that is more efficient and has an increased overall life and durability.

Figure 7A:
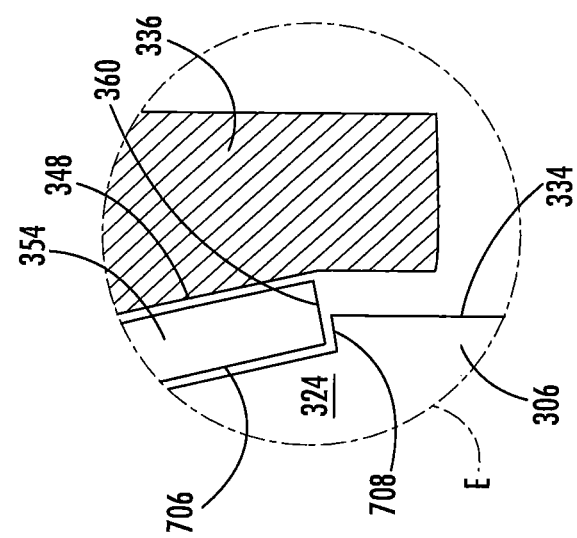
FIG. 7A is a schematic cross-sectional detail-view of a portion of the joint assembly illustrated in FIG. 7 of the disclosure.
Figure 7:
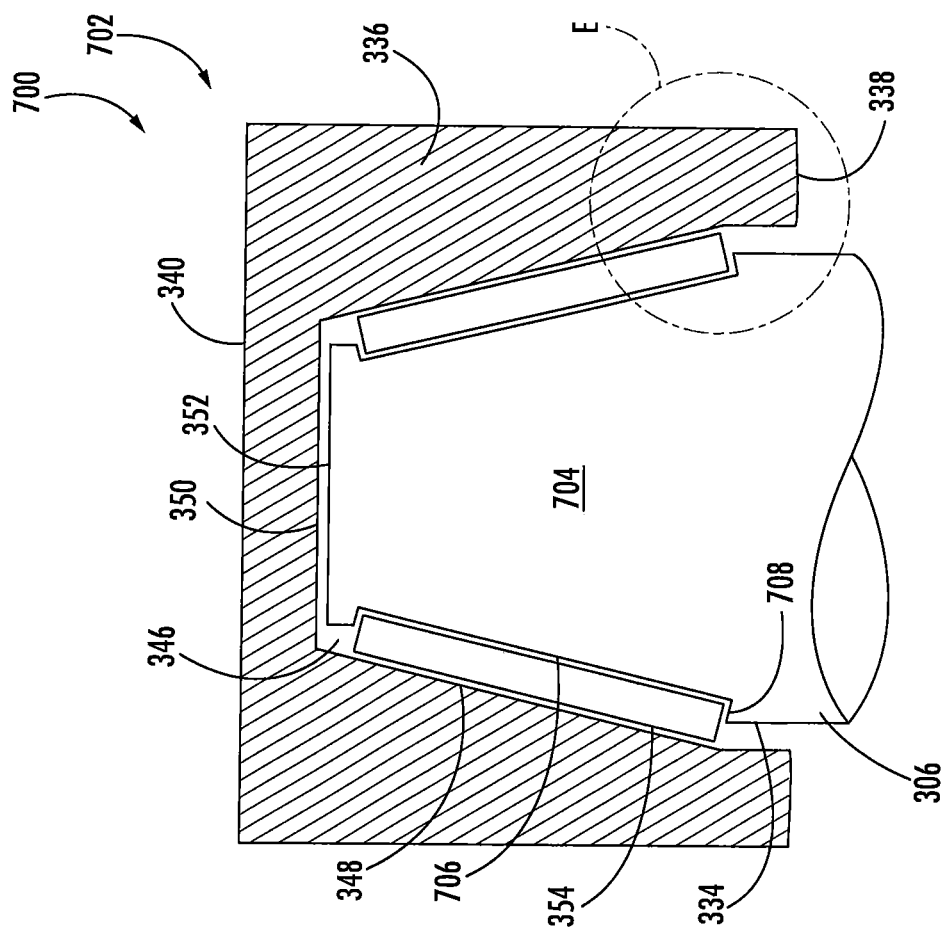
FIG. 7 is a schematic cross-sectional side-view of a portion of a joint assembly according to still yet another embodiment of the disclosure.

FIGS. 7 and 7A provide a schematic illustration of a joint assembly 700 having one or more bearing cup assemblies 572 according to another embodiment of the disclosure. The joint assembly 700 and the one or more bearing cup assemblies 702 illustrated in FIGS. 7 and 7A of the disclosure are the same as the joint assembly 300, 400, 500, and 600 and the one or more bearing cup assemblies 332, 402, 502, and 602 illustrated in FIGS. 3-6A, except where specifically noted below. In accordance with the embodiment illustrated in FIGS. 7 and 7A of the disclosure and as a non-limiting example the joint assembly 700 may be a universal joint assembly, a universal coupling assembly, a Spicer joint assembly, a Hooke's joint assembly or a U-joint assembly.

As illustrated in FIGS. 7 and 7A of the disclosure and as a non-limiting example, the outer surface 334 of the one or more trunnions 704 may include one or more bearing receiving portions 706 therein. The one or more bearing receiving portions 706 may extend inward into the one or more trunnions 704 away from the one or more side surfaces 348 of the receiving portion 346 of the bearing cup 336 of the one or more bearing cup assemblies 702. The one or more bearing receiving portions 706 in the one or more trunnions 704 may be of a size and shape to receive and/or retain at least a portion of the one or more bearings 354 therein. It is within the scope of this disclosure and as a non-limiting example that the one or more bearing receiving portions 706 may be disposed within the portion of the one or more trunnions 704 having a substantially frusto-conical shape.

According to an embodiment of the disclosure and as a non-limiting example, when the one or more bearings 354 are placed over the one or more trunnions 704, at least a portion of the one or more bearings 354 may be in direct contact with at least a portion of the outer surface 334 of the one or more trunnions 704 of the one or more third joint members 700. As a result, as the one or more bearings 354 are placed over the one or more trunnions 704, the outer surface 334 of the one or more trunnions 704 may elastically deform at least a portion of the one or more bearings 354. Once the one or more bearings 354 have translated into alignment with the one or more bearing receiving portions 706, at least a portion of the one or more bearings 354 may expand inward such that at least a portion of the one or more bearings 354 are disposed within one or more bearing receiving portions 706 in the one or more trunnions 704. It is therefore to be understood that once the one or more bearings 354 are installed within the one or more bearing receiving portions 706 in the one or more trunnions 704, an end 708 of the one or more bearing receiving portions 706 may provide a positive stop for and may prevent the one or more bearings 354 from coming out of the bearing cup 336 once installed. As a result, once installed, at least a portion of the first end 360 of the one or more bearings 354 may be in direct contact with at least a portion of the end 708 of the one or more bearing receiving portions 706 in the one or more trunnions 704.

In accordance with the embodiment where the one or more bearings 354 have an inner race 390, as the one or more bearings 354 are being installed over the on or more trunnions 704, the outer surface 334 of the one or more trunnions 704 may elastically deform at least a portion of the inner race 390. Once the inner race 390 is placed into alignment with the one or more bearing receiving portions 706 in the one or more trunnions 704, at least a portion of the outer race 392 of the one or more bearings 354 may expand inward such that at least a portion of the inner race 390 is disposed within one or more bearing receiving portions 706. It is therefore to be understood that once the one or more bearings 354 are installed within the one or more bearing receiving portions 706 in the one or more trunnions 704, the end 708 of the one or more bearing receiving portions 706 may provide a positive stop for and may prevent the one or more bearings 354 from coming out of the bearing cup 336 once installed. As a result, once installed, at least a portion of the inner race 390 of the one or more bearings 354 may be in direct contact with at least a portion of the end 708 of the one or more bearing receiving portions 706 in the one or more trunnions 704.

As a result of this arrangement, the one or more bearings 354 are able to support the loads experienced in both the axial and tangential planes when the one or more bearing cup assemblies 702 are in operation. Additionally, as a result of this arrangement, the thrust washers typically used in a bearing cup assembly are able to be eliminated, thereby reducing the overall weight, cost, assembly time, and/or complexity associated with the one or more bearing cup assemblies 702. Furthermore, as a result of this arrangement, the overall coefficient of friction and frictional losses experienced by the one or more bearing cup assemblies 702 is reduced, the overall efficiency of the joint assembly 700 is increased, the overall life and durability of the joint assembly 700 and the one or more beating cup assemblies 702 is increased, and the pre-load is easier to set.

By utilizing the one or more bearing cup assemblies 702 within the joint assembly 700, it provides the joint assembly 700 with a reduced overall coefficient of friction, an improved flex effort, an improved overall balancing, a reduced complexity, a reduced weight and is more cost efficient. Additionally, the one or more bearing cup assemblies 702 provides a universal joint assembly 700 that is more efficient and has an increased overall life and durability.

It is therefore to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A joint assembly, comprising:
a first joint member drivingly connected to a second joint member by using one or more third joint members;
wherein said one or more third joint members have a body portion with one or more trunnions extending outward therefrom;
one or more bearing cup assemblies having a bearing cup, one or more bearings, and one or more sealing members;
wherein said bearing cup has a receiving portion extending inward from a first end of said bearing cup;
wherein said receiving portion in said bearing cup has one or more side surfaces terminating in one or more bottom surfaces;
wherein at least a portion of said one or more bearings are interposed between an outer surface of said one or more trunnions and said one or more side surfaces of said receiving portion in said bearing cup; and
wherein at least a portion of said one or more sealing members are connected to and/or sealingly engaged with at least a portion of said bearing cup and said outer surface of said one or more trunnions;
wherein said one or more side surfaces of said receiving portion have one or more substantially arcuate portions;
wherein at least a portion of said one or more substantially arcuate portions are in direct contact with at least a portion of said one or more bearings of said one or more bearing cup assemblies;
wherein said one or more substantially arcuate portions of said one or more side surfaces of said receiving portion in said bearing cup have a first increasing diameter portion, a second decreasing diameter portion, and an innermost portion; and
wherein at least a portion of said innermost portion of said one or more substantially arcuate portions are in direct contact with at least a portion of said one or more bearings.

2. The joint assembly of claim 1, wherein said joint assembly is a universal joint assembly.

3. The joint assembly of claim 1, wherein at least a portion of said one or more trunnions have a substantially frusto-conical shape.

4. The joint assembly of claim 1, wherein at least a portion of said receiving portion in said bearing cup is substantially frusto-conical in shape.

5. The joint assembly of claim 1, wherein said one or more side surfaces of said receiving portion in said bearing cup extend at an angle θ1 inward toward said one or more trunnions of said one or more third joint members.

6. The joint assembly of claim 1, wherein said one or more sealing members has one or more support portions and one or more sealing portions;
wherein at least a portion of an outer surface of said one or more support portions are connected to at least a portion of said bearing cup; and
wherein at least a portion of said one or more sealing members are integrally connected to at least a portion of an inner surface of said one or more support portions.

7. The joint assembly of claim 6, wherein said one or more support portions of said one or more sealing members are in direct contact with and provide support for at least a portion of said one or more bearings of said one or more bearing cup assemblies.

8. The joint assembly of claim 6, wherein said one or more support portions of said one or more sealing members have a plurality of sealing member threads that are selectively meshingly engagable with a plurality of receiving portion threads on said one or more side surfaces of said receiving portion in said bearing cup.

9. The joint assembly of claim 8, wherein said one or more side surfaces of said receiving portion in said bearing cup have one or more sealing member attachment surfaces; and
wherein at least a portion of said plurality of receiving portion threads are disposed on said one or more sealing member attachment surfaces.

10. The joint assembly of claim 9, wherein one or more sealing member attachment surfaces extend substantially perpendicular to a first end of said bearing cup.

11. The joint assembly of claim 1, wherein a first end portion of said one or more side surfaces has one or more protruding portions extending inward from said one or side surfaces toward said one or more trunnions of said one or more third joint members; and
wherein at least a portion of said one or more bearings are disposed outboard from and/or are in direct contact with at least a portion of said one or more protruding portions of said one or more side surfaces.

12. The joint assembly of claim 11, wherein said one or more protruding portions of said one or more side surfaces of said receiving portion in said bearing cup have a plurality of receiving portion threads that are complementary to and selectively engagable with a plurality of sealing member threads on a support portion of said one or more sealing members.

13. A joint assembly, comprising:
a first joint member drivingly connected to a second joint member by using one or more third joint members;
  wherein said one or more third joint members have a body portion with one or more trunnions extending outward therefrom;
one or more bearing cup assemblies having a bearing cup, one or more bearings, and one or more sealing members;
  wherein said bearing cup has a receiving portion extending inward from a first end of said bearing cup;
  wherein said receiving portion in said bearing cup has one or more side surfaces terminating in one or more bottom surfaces;
  wherein at least a portion of said one or more bearings are interposed between an outer surface of said one or more trunnions and said one or more side surfaces of said receiving portion in said bearing cup;
  wherein at least a portion of said one or more sealing members are connected to and/or sealingly engaged with at least a portion of said bearing cup and said outer surface of said one or more trunnions;
  wherein a first end portion of said one or more side surfaces has one or more protruding portions extending inward from said one or side surfaces toward said one or more trunnions of said one or more third joint members;
  wherein at least a portion of said one or more bearings are disposed outboard from and/or are in direct contact with at least a portion of said one or more protruding portions of said one or more side surfaces; and
  wherein said one or more protruding portions of said one or more side surfaces of said receiving portion in said bearing cup have a plurality of receiving portion threads that are complementary to and selectively engagable with a plurality of sealing member threads on a support portion of said one or more sealing members.

* * * * *